Nov. 27, 1951 E. E. FOLKENROTH ET AL 2,576,831
DOUGH TROUGH HOIST
Filed June 23, 1949 3 Sheets-Sheet 2

INVENTOR.
EARL E. FOLKENROTH
ABELARDO G. AVILA
By Otto Mallen
Attorney

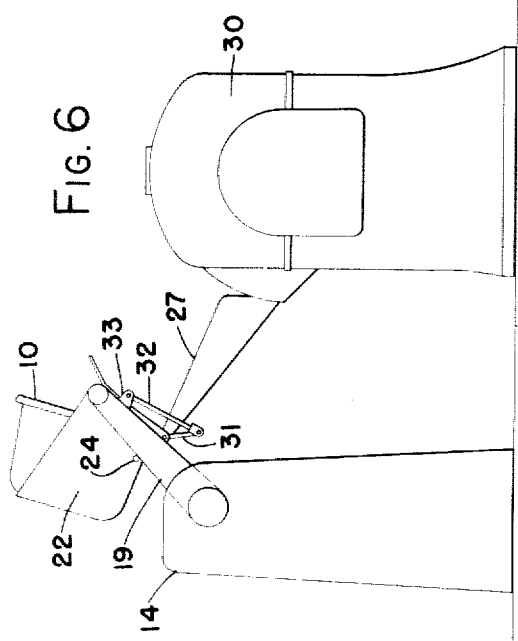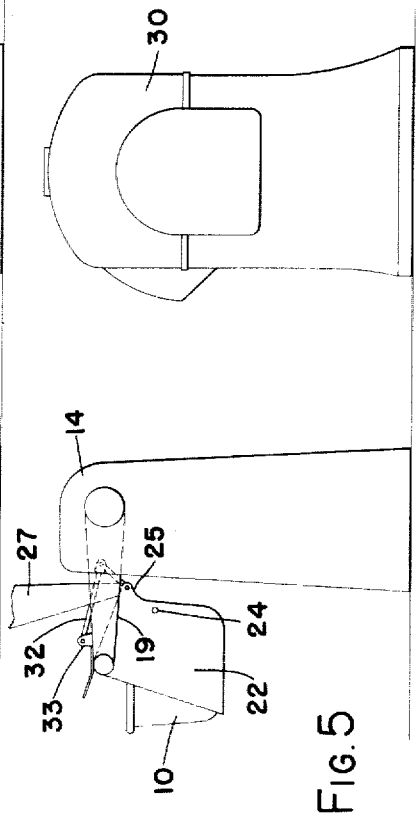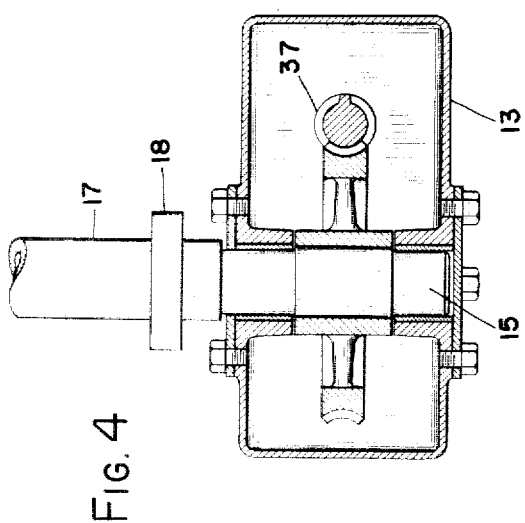

Patented Nov. 27, 1951

2,576,831

UNITED STATES PATENT OFFICE 2,576,831

DOUGH TROUGH HOIST

Earl E. Folkenroth and Abelardo G. Avila, York, Pa., assignors to The Standard Stoker Company, Inc., a corporation of Delaware Application June 23, 1949, Serial No. 100,912

4 Claims. (Cl. 214—1.1)

In commercial bread making, the dough is moved in huge troughs, mounted on casters, and pushed by workmen from a mixer to a proof room, and back again, or to a dough divider. As the tub of a mixer may be 5' high at the rim and the receiver of a dough divider may be about the same height it is apparent that getting the dough from the trough into the mixer tub or dough divider receiver requires heavy labor and involves danger of pollution.

The principal object of this invention is to provide a simple machine or hoist that will raise the loaded trough to an appropriate height and discharge the dough safely into the tub or dough divider receiver.

Generally speaking, this is accomplished with a trough cage or cradle swung on power-rotated cranks and equipped with means to tilt the cradle and trough at an appropriate height to deliver the dough to a chute leading to the mixer tub.

Fig. 4 is a horizontal section on the line 4—4 of Fig. 2;

Fig. 5 is a diagrammatic representation of the hoist in the position the parts assume after the power-operated cranks have moved through approximately 90 degrees; and Fig. 6 is a similar diagrammatic view showing the parts as the contents of the tub are being discharged through a chute into the tube of a mixer.

Figure 1:
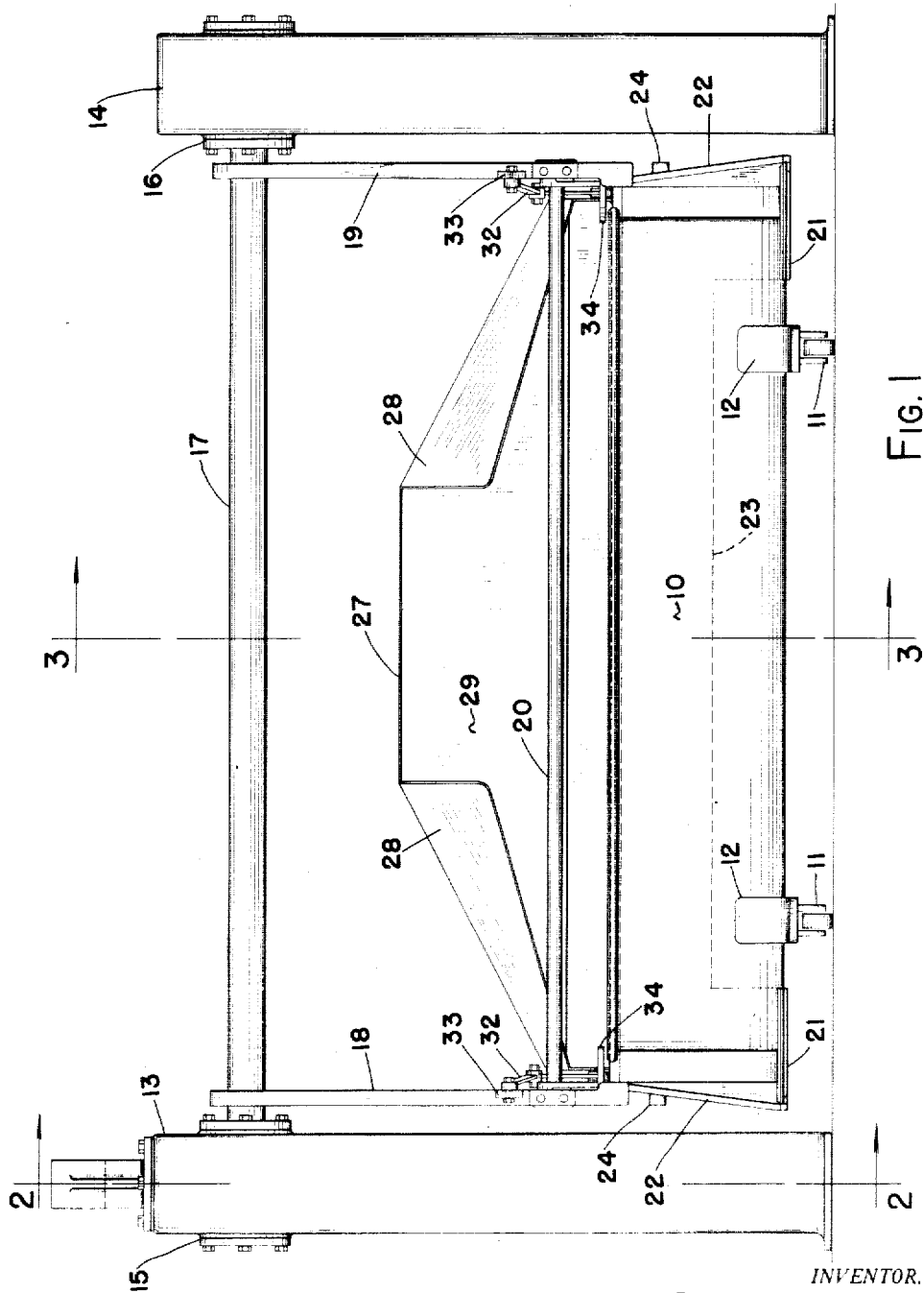
Fig. 1 is a front elevation of the hoist with the trough in position to be handled by it.
Figure 2:
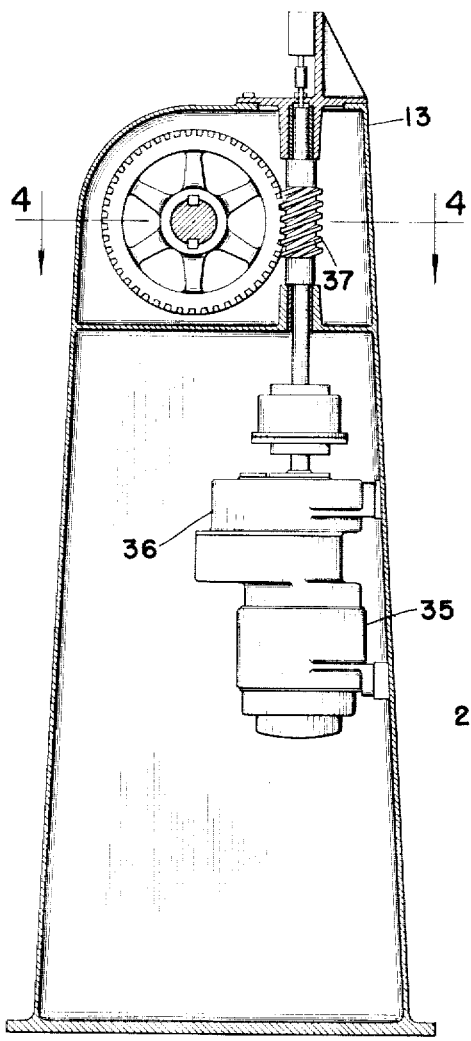
Fig. 2 is a vertical section on the line 2—2 of Fig. 1.

But these specific drawings and the corresponding description are used for the purpose of illustrative disclosure only.

This embodiment is designed for use with 10' Union Steel troughs DT 3410 shown at 10 mounted on 6" casters 11 by means of brackets 12 and having an overall height of 31⅝".

The hoist includes side mounts or columns 13 and 14 equipped with bearings 15 and 16 for a main power driven and supporting shaft 17 having adjacent to the bearings 15 and 16 crank arms 18 and 19 connected at their free ends by an auxiliary cradle supporting shaft 20.

The cradle, in this instance, is a generally rectangular box open at the top and one side and cut away at the bottom and the back to afford clearance for the casters 11 and the brackets 12. It is thus composed of bottom supporting pieces or ledges 21 at each side and connected with flaring side pieces 22 journalled on the auxiliary shaft 20 and secured to the back 23, which is also secured to the bottom pieces 21. Thus, the cradle takes the form of side stirrups swung from the auxiliary shaft 20 and connected by the back 23.

The side pieces 22 are equipped with pins or abutments 24 at their outer sides to bear against the crank arms 18 and 19 as the parts move from the position shown in Fig. 5 to that shown in Fig. 6, and thus effect the tilting of the cradle and the trough.

The side pieces are also extended rearwardly over the back 23 to form brackets 25 in which a chute shaft 26 is journalled. Fixed to that shaft for rotation with it is a dough chute 27 having a generally flat body portion and sides 28 converging and increasing in height toward the free end of the chute, as best shown in Figs. 1 and 3.

Figure 3:
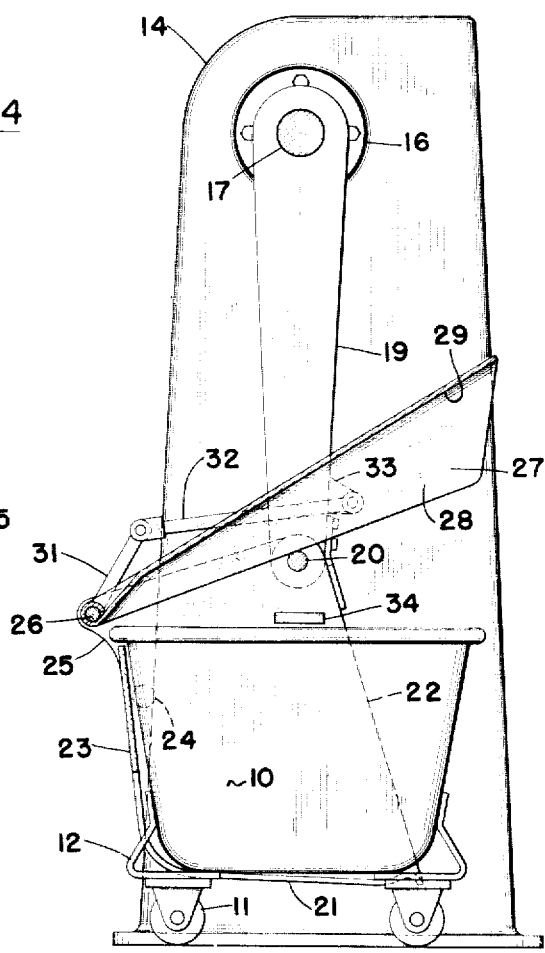
Fig. 3 is a vertical section on the line 3—3 of Fig. 1 with the trough shown in elevation.

The chute is automatically moved from the inverted position shown in Fig. 3, where the dough contacting surface 29 is protected from dust and it covers the trough 10, to the position shown in Fig. 6, in which it serves to guide the dough from the trough 10 into the mixer 30.

This is accomplished by linkage including levers 31 fixed to the shaft 26 and connected by pivoted links 32 with brackets 33 on the crank arms 18 and 19.

In operation, the trough to be emptied into a mixer or the like is rolled into the position shown in Figs. 1 and 3, and the shaft 17 is set in rotation. The crank arms 18 and 19 lift the cradle, and with it the trough, and move it through the position shown in Fig. 5 to that shown in Fig. 6.

The arms move through approximately 120 degrees while the cradle with the trough swings free and upright by gravity. Then, the pins 24 strike the crank arms 18 and 19, and the cradle and trough begin to tilt toward the position shown in Fig. 6 and the dough is discharged down the chute 27, which is automatically moved into the correct position leading from the trough to the mixer.

In this latter position, the trough rests against the back 23 of the cradle, and, if necessary, its rim is sustained by brackets 34 on the inside of the side pieces 22 of the cradle.

Preferably, the shaft 17 is power operated under control of push buttons, up, down, and stop, and limit switches. As here shown, it is driven by an electric motor 35 through reducing gearing 36 and worm gearing 37. With such an arrangement, the operation described will be initiated by pushing an "up" button, which will start the motor, to rotate the shaft 17 in a clockwise direction in Figs. 5 and 6 and a counter-clockwise direction in Fig. 3. As it approaches the position shown in Fig. 6, a suitable limit switch will stop the motor. The return movement will be initiated by pushing the "down" switch, which will reverse the shaft, and, as the parts approach the positions shown in Figs. 1 and 3, another limit switch will stop the motor again. The "stop" button is for stopping the cradle in any position desired.

This particular embodiment designed for the 10' Union Steel trough has the axis of the main shaft 17, 6'4" from the floor, and 12'8⅞" on centers in the bearings 15 and 16. The shaft oscillates through an arc of 240 degrees in about 30 seconds, and the chute 27 automatically takes a position to deliver the dough into the mixer at a height of 5'.

Different troughs will require changes in construction of cradle or cage, and make other appropriate changes desirable.

While the main shaft may be supported from over-head structure, the arrangement shown is very well suited to common conditions in bakeries in which the floors are strong enough to carry the loads.

The overall height of the apparatus brings it well within the common clearances, and also gives ample head room beneath the main shaft 17.

The chute is normally in inverted position, where it is protected from dirt and dust, and is easily accessible for cleaning and greasing.

We claim:

1. In a device of the class described, a main shaft, rotary crank arms on the shaft, a cradle mounted to swing on the crank arms and bear a dough trough, means to limit relative movement between the crank arms and the cradle whereby the arms will first raise the cradle with freedom to swing from them and afterwards will tilt the cradle to discharge dough from the trough borne by it, a chute associated with the cradle, and means to swing the chute from a position over the trough borne by the cradle to a position to receive dough from the trough.

2. In a device of the class described, a main shaft, rotary crank arms on the shaft, a cradle mounted to swing on the crank arms and bear a dough trough, means to limit relative movement between the crank arms and the cradle whereby the arms will first raise the cradle with freedom to swing from them and afterwards will tilt the cradle to discharge dough from the trough borne by it, a chute rotatably mounted on the cradle, and linkage to swing the chute from an inverted position over the trough borne by the cradle to a position to receive dough from the trough.

3. In a device of the class described, a main shaft, rotary crank arms on the shaft, a cradle mounted to swing on the crank arms and bear a dough trough, means to limit relative movement between the crank arms and the cradle whereby the arms will first raise the cradle with freedom to swing from them and afterwards will tilt the cradle to discharge dough from the trough borne by it, a chute pivotally mounted on the cradle, and linkage connecting the said chute with said crank arms, said linkage being operative by swinging movement of said crank arms to swing the chute from an inverted position over the trough borne by the cradle to a position to receive dough from the trough.

4. In a device of the class described, a main shaft, rotary crank arms on the shaft, a cradle mounted to swing on the crank arms and bear a dough trough, means to limit relative movement between the crank arms and the cradle whereby the arms will first raise the cradle with freedom to swing from them and afterwards will tilt the cradle to discharge dough from the trough borne by it, a chute pivotally mounted on the cradle, and linkage connecting said chute and said crank arms, said linkage being responsive to the relative movement between the cradle and arms to swing the chute outwardly about its pivotal connection from an inverted position over the trough borne by the cradle, said chute being movable thereafter as a unit with said cradle to a position to receive dough discharged from the trough.

EARL E. FOLKENROTH.
ABELARDO G. AVILA.

REFERENCES CITED

The following references are of record in the file of this patent:

UNITED STATES PATENTS

| Number | Name | Date |
|---|---|---|
| 141,808 | Morton | Aug. 12, 1873 |
| 1,943,614 | McCarron | Jan. 16, 1934 |
| 2,186,478 | DeHuff | Jan. 9, 1940 |

FOREIGN PATENTS

| Number | Country | Date |
|---|---|---|
| 161,771 | Great Britain | Apr. 21, 1921 |
| 406,951 | France | 1910 |

Certificate of Correction

Patent No. 2,576,831 November 27, 1951

EARL E. FOLKENROTH ET AL.

It is hereby certified that the name of the assignee in the above numbered patent was erroneously described and specified as "The Standard Stoker Company, Inc." whereas said name should have been described and specified as *Read Standard Corporation*; and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*